A. WINTON.
TRANSMISSION MECHANISM.
APPLICATION FILED MAY 4, 1906.

951,037.

Patented Mar. 1, 1910.

Witnesses
C. R. Wright Jr.
G. W. Ethuling

Inventor
Alexander Winton,
By A. S. Pattison,
Attorney

UNITED STATES PATENT OFFICE.

ALEXANDER WINTON, OF CLEVELAND, OHIO.

TRANSMISSION MECHANISM.

951,037.  Specification of Letters Patent.  Patented Mar. 1, 1910.

Original application filed May 25, 1903, Serial No. 158,714. Divided and this application filed May 4, 1906. Serial No. 315,230.

*To all whom it may concern:*

Be it known that I, ALEXANDER WINTON, a citizen of the United States, residing at Cleveland, in the county of Cuyahoga and State of Ohio, have invented certain new and useful Improvements in Transmission Mechanism, of which the following is a specification, reference being had therein to the accompanying drawing.

This invention relates to improvements in transmission mechanism, which is especially adapted for use in automobiles, and is a division of my application filed May 25th, 1903, bearing Serial Number 158,714.

Figure 1:
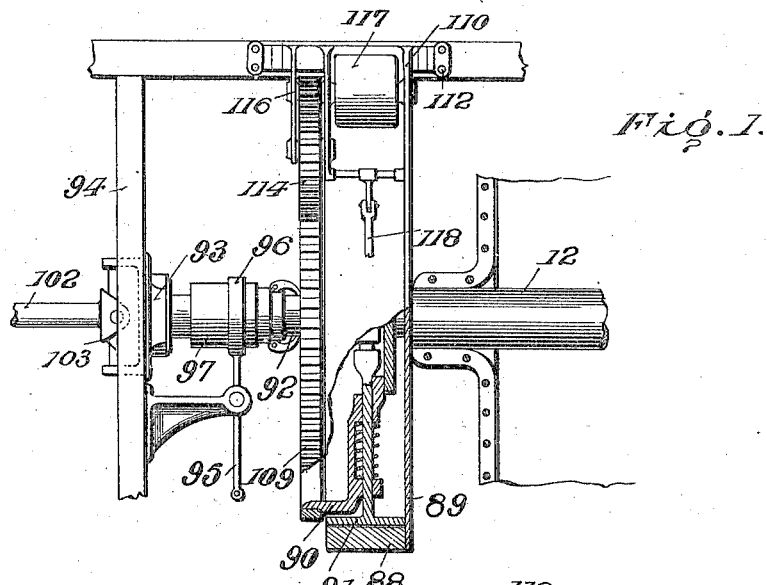
Figure 2:
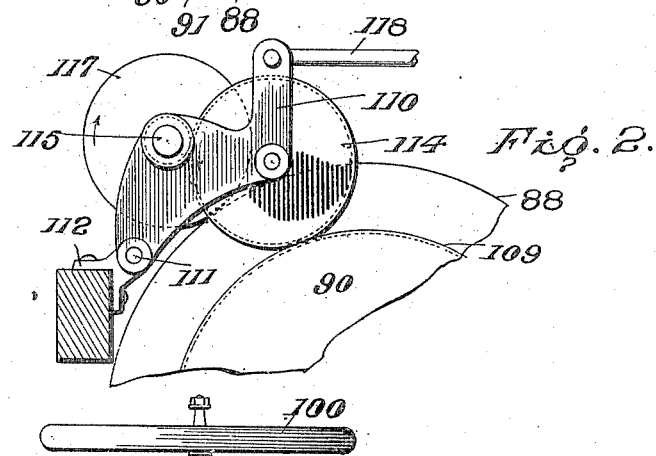
Figure 3:
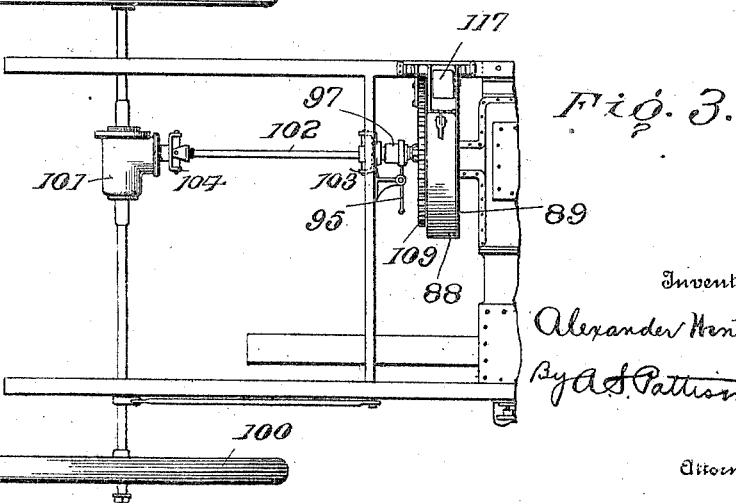

In the accompanying drawings, Figure 1, is a top plan view, partly in section, of a transmission mechanism which embodies my present invention. Fig. 2, is an enlarged side elevation of the reversing mechanism. Fig. 3, is a plan view of a motor vehicle frame with my invention in place thereon.

The present invention pertains to a mechanism for transmitting power from the engine shaft for propelling the vehicle, and which includes means for disconnecting the engine from the transmitting mechanism, and the mechanism for reversing the motion of the driven mechanism and thereby backing the vehicle.

The rear end of the engine shaft 12, as here shown, carries a device for transmitting the motion. This device acts as a fly-wheel for the engine, and consists of a disk 89 to which is attached a laterally-extending collar 88, the inner surface of which acts as a clutching face. A member 90 is located within the collar or balance wheel 88, and carries friction shoes 91 adapted to engage and disengage the interior surface of the collar in any desired manner. This clutch is carried upon one end of a short shaft 92, the opposite end being journaled in a bearing 93 which is supported from a cross-bar 94. The clutch is controlled through the medium of a lever 95 having one end provided with a yoke 96 engaging a movable collar 97. A shaft 102 has one end connected with the outer end of the short shaft 92 through the medium of a suitable universal joint or connection 103. The opposite end of this shaft 102 is suitably operatively connected with the driving wheels 100 of the vehicle, through the usual compensating gear located in an inclosure 101. When the clutch is in engagement with the collar 88, the engine shaft 12 is directly connected with the driven shaft 102, and the engine is driving direct for the forward propulsion of the vehicle.

The reversing mechanism consists of a gear 109 carried by the member 90, and a rocking frame 110 is pivotally connected to the adjacent side sill of the vehicle frame, or other suitable support, at a point 111 through the medium of a bracket 112. Journaled in this rocking shaft 110 is a gear 114, and this gear is adapted to mesh with the gear 109. A shaft 115 is journaled in the rocking frame 110, and this shaft carries a pinion 116 which is constantly in mesh with the gear 114. Carried by the shaft 115 is a friction roller 117. The operation of this reversing mechanism is as follows:—When the rocking frame 110 is caused to assume the position shown in Fig. 2, through the medium of an operating rod or connection 118, the gear 114 is brought slightly into mesh first with the gear 109, which is carried by the member 90. A further movement of the rocking frame will cause the friction disk 117 to engage the outer surface of the balance wheel or collar 88. At this time the clutch is out of contact with the balance wheel, and the friction roller 117 is in engagement with the balance wheel, and causes the clutch member 90 through the intervention of the pinion 116, and gears 114 and 109, to revolve in a direction opposite the direction of revolution of the balance wheel, and thus impart to the shaft 102 a reverse revolution for backing the vehicle. When this reversing mechanism is not in operation, the rocking frame 110 is carried to a position which disengages the gears 114 and 109, and as a consequence carries the friction roller 117 out of contact with the balance wheel 88, and the reversing mechanism is entirely out of operation when the clutch member 90 is thrown into action with the balance wheel for driving the vehicle forward. From this it will be observed that when the vehicle is being driven forward, the clutch member and balance wheel 88 make a direct drive from the engine shaft 12 to the driven shaft 102. There being no intervening gearing in operation, and no idly rotating reversing mechanism, the forward transmission mechanism here shown is very quiet running, and saves the wear and tear upon idly revolving mechanism, and also the power necessary to drive it.

The shafts of the driving wheels 100 of the vehicle are connected by a compensating gearing of any suitable form which are so well understood by those skilled in the art that any specific illustration or description thereof is unnecessary. This compensating gearing is located in a suitable boxing 101, and the shaft 102 has its rear end operatively connected with the compensating gearing in a well known way, and the forward end of the shaft 102 is connected with the short shaft 92 by means of a suitable form of universal joint 103, and preferably there is a universal joint 104 at the opposite end of the shaft 102. This universal arrangement is for the purpose of permitting the up and down movement of the rear driven axle which is supported upon springs 105.

Having thus described my invention, what I claim and desire to secure by Letters Patent, is:—

1. A transmission mechanism comprising a motor, a balance wheel therefor, a transmission mechanism including a clutch member co-acting with the interior surface of the balance wheel, said clutch member projecting beyond the said balance wheel rim, and a reversing mechanism co-acting with the outer peripheries of said balance wheel rim, and the projecting portion of said clutch member.

2. In a motor vehicle, the combination of an explosive engine provided with a crank shaft, a connecting shaft, a vehicle driving axle operatively connected with one end of the connecting shaft, the opposite end of the connecting shaft and crank shaft having respectively a gear and a flange or collar, one of said latter members provided with a co-acting movable clutch member, and a reversing mechanism including a gear meshing with the aforesaid gear, and a friction roller adapted to engage said collar.

3. A transmission mechanism comprising a motor, a balance wheel therefor, a driven shaft, a movable rotatable clutch member co-acting directly with the balance wheel and said driven shaft to rotate it in one direction, and a reversing mechanism including two operatively connected oppositely rotating wheels, one of said wheels actuated by the balance wheel, and the other of said wheels operatively connected with said clutch member to rotate it in a direction opposite the direction of rotation of the balance wheel.

4. In a motor vehicle, the combination of an explosive engine having a crank-shaft provided with a collar or sleeve, a connecting shaft, a vehicle drive shaft operatively connected with one end of said connecting shaft, the opposite end of the connecting shaft having a clutch member adapted to co-act with the inner surface of said collar, the adjacent end of the connecting shaft having a gear wheel, and a reversing mechanism including a gear adapted to engage the aforesaid gear and a friction roller adapted to engage the outer surface of the collar and co-acting with said gears to impart a reverse motion to the connecting shaft.

5. In a motor vehicle, the combination of an explosive engine having a crank shaft, a vehicle drive shaft, a connecting shaft having one end operatively connected with the vehicle drive shaft, the adjacent ends of the crank shaft and connecting shafts having respectively a gear and a friction collar, a clutching mechanism between the collar and the adjacent end of the connecting shaft, and a reversing mechanism including a movable frame having a friction roller adapted to be carried in engagement with the said collar, the friction roller provided with a pinion, and a gear between said pinion and the gear carried by the connecting shaft, whereby the reversing mechanism may be thrown into operation or entirely out of operation when not in use.

In testimony whereof I affix my signature in presence of two witnesses.

ALEXANDER WINTON.

Witnesses:
  W. J. WARD,
  H. L. ORR.